US012757845B2

(12) United States Patent
Massey et al.

(10) Patent No.: US 12,757,845 B2
(45) Date of Patent: Oct. 13, 2026

(54) ENCLOSED HOME GROWING ENVIRONMENT

(71) Applicant: Heliponix, LLC, Evansville, IN (US)

(72) Inventors: Scott Thomas Massey, Evansville, IN (US); Ivan Lee Ball, Owensville, IN (US)

(73) Assignee: Heliponix, LLC, Evansville, IN (US)

( * ) Notice: Subject to any disclaimer, the term of this patent is extended or adjusted under 35 U.S.C. 154(b) by 0 days.

(21) Appl. No.: 18/691,987

(22) PCT Filed: Nov. 4, 2022

(86) PCT No.: PCT/US2022/048925
§ 371 (c)(1),
(2) Date: Mar. 14, 2024

(87) PCT Pub. No.: WO2023/081333
PCT Pub. Date: May 11, 2023

(65) Prior Publication Data

US 2024/0349669 A1 Oct. 24, 2024

Related U.S. Application Data

(60) Provisional application No. 63/263,593, filed on Nov. 5, 2021.

(51) Int. Cl.
*A01G 31/06* (2006.01)

(52) U.S. Cl.
CPC .................................... *A01G 31/06* (2013.01)

(58) Field of Classification Search
CPC ...................................................... A01G 31/06
See application file for complete search history.

(56) References Cited

U.S. PATENT DOCUMENTS

| | | | | |
|---|---|---|---|---|
| 6,134,831 A * | 10/2000 | Lo | A01G 31/06 47/61 |
| 2017/0094920 A1* | 4/2017 | Ellins | A01H 4/001 |
| 2017/0258015 A1* | 9/2017 | Cudmore | C05F 17/95 |
| 2020/0100444 A1* | 4/2020 | Lu | A01G 31/065 |
| 2021/0176935 A1 | 6/2021 | Massey et al. | |

FOREIGN PATENT DOCUMENTS

| | | | |
|---|---|---|---|
| CN | 112514678 A * | 3/2021 | |
| GB | 2431328 A * | 4/2007 | A01G 31/02 |
| WO | WO-2020041242 A1 * | 2/2020 | A01G 31/04 |

OTHER PUBLICATIONS

Translation of CN-112514678-A (Year: 2021).*
The PCT Search Report and Written Opinion mailed Mar. 2, 2023 for PCT application No. PCT/US22/48925, 14 pages.
Extended European Search Report for European Application No. 22890806.7, Dated Jul. 28, 2025, 8 pages.

* cited by examiner

*Primary Examiner* — Kimberly S Berona
*Assistant Examiner* — Steven J Shur
(74) *Attorney, Agent, or Firm* — Lee & Hayes, P.C.

(57) ABSTRACT

An appliance for the cultivation of indoor plants and vegetation. The appliance may include a planting column with multiple receptacles for receiving seed cartridges. The appliance may provide nutrients, fluids, and light based on specific characteristics of each individual plant being cultivated. In various implementations, the appliance may be under-the-counter, counter-top, and/or ceiling height configurations.

20 Claims, 12 Drawing Sheets

ENCLOSED HOME GROWING ENVIRONMENT

CROSS-REFERENCE TO RELATED APPLICATIONS

This application is a U.S. national stage application under 35 USC § 371 of International Application No. PCT/US22/48925 filed on Nov. 4, 2022 and entitled "ENCLOSED HOME GROWING ENVIRONMENT," which claims priority to U.S. Provisional Application No. 63/263,593, filed on Nov. 5, 2021 and entitled "ENCLOSED HOME GROWING ENVIRONMENT," the entire contents of which are incorporated herein by reference.

BACKGROUND

Home gardening and usage of micro gardens in apartment complexes and neighborhoods has grown in recent years throughout the United States in response to food deserts limiting the availability of fresh produce in densely populated areas. More consumers desire to have fresh produce and herbs grown at home to provide fresher produce, as well as to limit the preservatives and chemicals used in large grocery stores. Depending on climate, homeowners may be limited to indoor systems for growing fresh produce and herbs. However, most indoor systems are limited in space and provide unitary growing conditions for all produce and herbs that often results in suboptimal conditions for all produce and herbs being produced by the homeowner. Additionally, homeowners often lack the education and time to properly maintain optimal growth conditions for each individual species and type of plant.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

Figure 1:
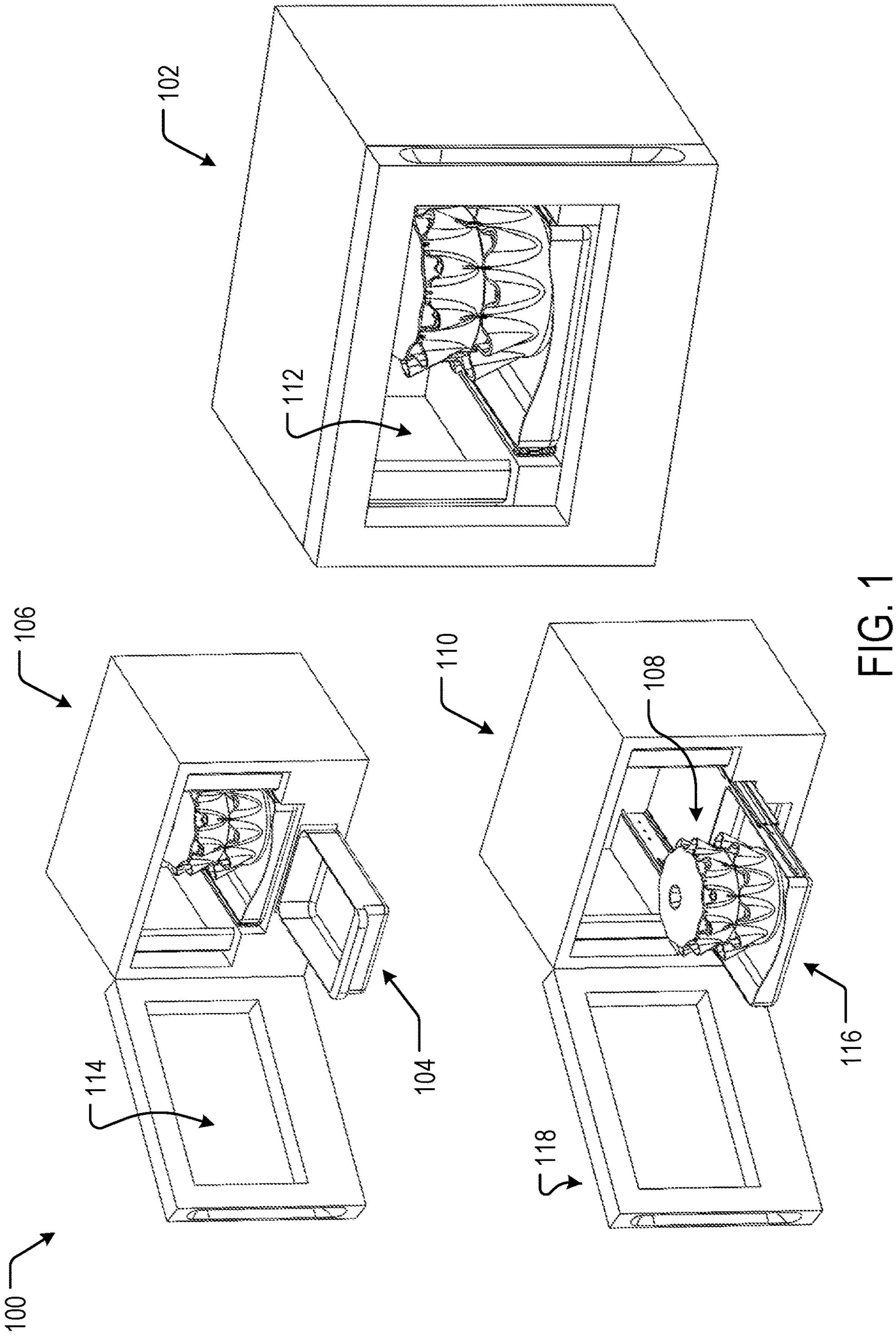
FIG. 1 is an example pictorial diagram of a countertop enclosed growing environment or appliance according to some implementations.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Discussed herein are systems and methods associated with environments and appliances for automating, optimizing, and customizing at home enclosed growing appliances (such as a micro garden) or plant growing apparatuses for individual users. For example, the systems, discussed herein, may be configured to provide an enclosed growing environment for at home and indoor cultivation of plants and fungi, flowers, produce, mushrooms, herbs, nutraceuticals, medicinals, and/or other vegetation. The system may, in some implementations, provide an isolated enclosure that is configured to provide stable and controlled environmental conditions, physically separated from the conditions within surrounding environment (e.g., the home or apartment).

In some examples, the enclosed growing environment may be configured with one or more planting columns or towers configured to receive one or more seed containers (such as a seed cartridge or pod) via one or more receiving slots, receptacles, or cavities. For example, the planting columns may comprise a plurality of receptacles configured to receive individual seed cartridges. The planting receptacles may be arranged both in vertical columns and horizontal rows about the planting column. In some cases, the planting slots may be staggered from row to row to provide additional vertical space as the individual plants mature, leaf, and/or otherwise grow. In these cases, staggering the planting receptacles allows the system to be able to monitor each individual plant as well as allowing each individual plant sufficient room during each stage of the plants lifecycle. In one specific example, the planting column may include five rings with ten planting receptacles per ring. In some cases, the rings may be offset so the plating receptacles do not substantially align or directly overlap with each other resulting in a system with twenty columns and five rows of planting receptacles. In other cases, the number of rows and/or columns may be based on a height and width of the system, enclosure, and/or the planting column. For example, a countertop growing appliance may have two or three rows or a counter height appliance may have between five and ten rows, while an upright full height appliance may have between fifteen and twenty rows. In some cases, the number of columns may also be based at least in part on the size of the appliance or system. For example, some systems may include a retractable tray that houses the columns that may allow access to two or more adjacent columns, as discussed in more detail below.

In some cases, the planting column may be rotatable three-hundred and sixty degrees within the enclosure and about a base, or any other limited rotation. For example, a drive motor may be configured to mechanically or magnetically rotate the planting column within the enclosure based on one or more control signals from a monitoring and control system. These columns may or may not rotate independently from its base. Each column may rotate at different rates relative to the specific plants lighting requirements, or other variables.

In some instances, as the planting columns rotate such that each individual planting slot may be configured to receive water, light, nutrients, and other growth related stimulus and resources on an individualized basis based at least in part on the individual plant currently occupying the receptacle. For example, a water reservoir can be coupled to the planting column and/or one or more moisture sensors to detect moisture levels of, for instance, a growing medium of seed pods within each individual planting slot. In some cases, the system may include a water reservoir that may be equipped with additional sensors to monitor the water level within the water reservoir. In some cases, the system may use the sensor data to determine the reservoir needs to be refilled and alert a user that the water level is low. In other cases, the system may be plumbed and activate one or more valves to allow the water reservoir to be refilled to a desired or predetermined amount. In some cases, the reservoir may include multiple chambers to, for instance, filter, clean, introduce nutrients into, or otherwise process the water prior to delivery to the planting slots. Additionally, the plant growing apparatus can further comprise additional reservoirs to store other materials and liquids such as liquid plant nutrients. An additional mixing reservoir can be present that allows for water from the water reservoir to mix with the desired mixture of nutrients prior to being dispensed within the system.

In some examples, a lighting and control column or panel may be configured within the enclosure or along a specific region of the enclosure. The lighting and control column may be equipped with various sensors for monitoring the individual plants. For example, the lighting and control column may be equipped with one or more sensors, such as image devices (e.g., red-green-blue image devices, infrared image devices, monochrome image devices, and the like), humidity sensors, temperature sensors, carbon dioxide (CO2) sensors, spectral sensors, and the like. The lighting and control column may also be equipped with one or more illuminators (such as visible lights, infrared illuminators, ultraviolet lights, lasers, and the like). The illuminators may be adjustable to provide specific spectrums, amounts of light, and intensities of light to each individual planting slot based on the corresponding plant's health, life stage, size, and type or species.

In some implementations, the system may also be configured to provide data, analytics, and notifications/alerts to the owner or user of the system. For example, the system may be in wireless communication with a network or user device associated with the owner. The system may analyze the captured sensor data with respect to each individual plant to determine a life stage and health associated therewith. In some cases, the system may provide a progress report, such as a growth score card, on a periodic basis (e.g., daily, weekly, monthly, etc.) that may be presented to the user via the user device, mobile device, and/or, for instance, an associated application hosted by the user mobile device. In some instances, the periodic basis may be defined by the user, determined based on the type and species of plants within the enclosure, an age or life stage of the plants within the enclosure, a number of plants within the enclosure, and/or a combination thereof. In some cases, growth may be hindered purposefully to ensure optimal harvest peak and nutritional densities to be timed with a user's planned time to harvest to coincide with their meal calendar.

In some implementations, the system may also provide a harvest alert to the user for each individual plant. For instance, the system may determine, based on the sensor data, that a plant has reached between 90 percent and 95 percent of the plants maximum growth and should be harvested to improve overall yields of the system and to optimize taste (e.g., prevent bitterness that may occur when the plant starts to decay or stress). In some instances, the harvest thresholds (e.g., size, life stage, growth potential, taste, and the like) may be selected by the system based at least in part on a user input, such as the type of preparation (e.g., salad, cooked, dried, and the like) the user plans for the particular plant or plants. For instance, earlier harvesting of plants may improve taste when the plant is eaten raw while later harvesting may increase yields, which may be preferred when the plant is being cooked.

In some cases, the system or a cloud-based service associated with and in communication with the system may be configured to generate health, harvest, and taste thresholds for the growth of individual species and types of plants based on past yield and harvest conditions of the system, on past yield and harvest conditions of other systems, and various user inputs (such as answers to user surveys or notifications, user harvest preferences, user's meal preparation preferences, and the like). For example, the system may input the sensor data and/or user preferences and habits into one or more machine learned models that may output various conditions and thresholds associated with the system, such as notification or alert thresholds, plant health thresholds, lighting control thresholds, harvest thresholds, and the like. In some cases, the system may also provide discard alerts or warnings, such as when a plant is unhealthy or infected in a manner that risks the reminder of the harvest, or when there is an unexpected slow growth rate (e.g., a growth rate less than a threshold amount based on the type or species, age, etc. of the particular plant).

In some examples, the seed cartridge or pods may be specifically designed to mate and/or otherwise be received within a cavity defined by the planting slot of the planting columns. The seed cartridges may be a self-contained apparatus having an exterior structure of one or more surfaces or walls that contain one or more seeds suspended in one or more layers of substrate or growing medium. Semi permeable filters or small root orifices may provide some external exposure for water entering and exiting the seed cartridge.

FIG. 1 is an example pictorial diagram of a countertop enclosed growing environment or appliance 100 according to some implementations. As illustrated, the countertop enclosed growing environment 100 is shown in a closed position, generally indicated by 102, an open position, generally indicated by 106, with a water reservoir 104 removed and an open position, generally indicated by 110, with the planting column 108 extended and the water reservoir 104 inserted. As illustrated, in the closed position 102, the growing chamber 112 may be physically isolated from the surrounding environment. In this manner, the growing chamber 112 may maintain its own set of environmental conditions (temperature, humidity, air quality or composition, and the like), lighting conditions (e.g., wavelengths, intensity, types, duration, targets or direction, and the like.

In the current example, the enclosed growing environment 100 is shown with a transparent or glass viewing area 114. However, in some examples, the transparent area 114 may be opaque, semi-opaque or semi-transparent, or capable of transitions between transparent and/or opaque depending on the conditions in the outside environment. For example, if the lighting conditions in the exterior environment have unwanted wavelengths, are too intense, or the like, the system 100 may cause the transparent area 114 to transition to an opaque state and/or otherwise close or block the transparent area 114. In some cases, the area or glass 114 may transition its state. In this case, the state may include a gradient that spans from transparent to semi-opaque to fully opaque. In other cases, a blind or cover may be deployed from an open position to a closed position to block the exterior environmental conditions.

In the first open configuration 106, the water reservoir 104 is removed. For example, a user or operator of the system may remove and fill the water reservoir 104 in response to receiving an alert from the enclosed environment 100 via, for instance, a mobile application, web application, or in conjunction with a cloud-based service and a personal electronic device. In some cases, the water reservoir 114 may be equipped with one or more sensors that monitor an amount of water remaining in the reservoir 114 and provide the alert in response to one or more thresholds (e.g., water levels) being meet or exceeded. For example, the alert may be transmitted when the water level in the water reservoir 104 falls below 50 percent full, 25 percent full, 10 percent full or the like. In some implementations, the alerts may be transmitted in response to multiple water level thresholds being met or exceeded such as the water falling below each of a 50 percent full, 25 percent full, 10 percent threshold.

In the current example, the appliance 100 may include a cavity, generally indicated by 120, for receiving the water reservoir 104 prior to the door 118 being closed to isolate the growing chamber 112 from the exterior environment. In some cases, the cavity 120 may be sized to substantially match the size of the water reservoir 104. In some cases, the cavity 120 may define one or more guides or grooves (not shown) that may allow the water reservoir 104 to be inserted in a more controlled manner. The water reservoir 104 may also include one or more handles that may be used by an operator of the appliance 100 to remove and/or carry the water reservoir 104 to and from refilling events. In some cases, the handles 122 may be configured on both of the opposing sides of the water reservoir 104 to provide for ease in carrying the water reservoir 104 to a water source for filling.

As illustrated in the second open configuration 110, the appliance 100 may also include a retractable base 116 that supports the planting column 108. The retractable base 116 may be configured to manually (e.g., in response to a physical force) or automatically (e.g., in response to an opening of the door 118) extend outward from a plane of the front surface of the enclosure 100 as shown. In this way, a user of the enclosure 100 may access the plants growing in and/or the planting column 108 itself in a substantially 360 degree manner. In some examples, the user may be able to cause the planting column 108 to rotate, via the mobile application and/or a switch on the appliance 100, smart home assistant verbal command, while the retractable base 116 is extended to further improve the ease of access to various plants being grown within the appliance 100. In some cases, the retractable base 116 may be configured to extend and retract at predetermined rates to avoid any harm or potential damage to the plants inhabiting the planting column 108. For example, the rate may be set to prevent a seed cartridge from falling or dislodging from the planting column 108 while the base 116 is moving.

The retractable base 116 may include a track 122 that may be coupled to both the right and left side of the base 116 and, accordingly, along the interior surfaces of the appliance 100 within an interior of the growing chamber 112. The tracks 122 may allow the base 116 to extend and retract along a guide or otherwise controlled manner.

Once harvesting and/or inspection is complete, the user or operator may cause the retractable base 116 to return inward into the interior of the growing chamber 112. For example, the user may push or otherwise apply a force to the base 116. In other examples, the base 116 may retract in response to a selection of an icon or button the mobile application, the switch on the enclosure 100, and/or a closing of the door 118. In some examples, once the door 118 is closed, the appliance 100 may lock, seal, or otherwise secure the door 118 in the closed position 102 to ensure that the interior of the growing chamber 112 is environmentally isolated from the exterior physical conditions.

Figure 2:
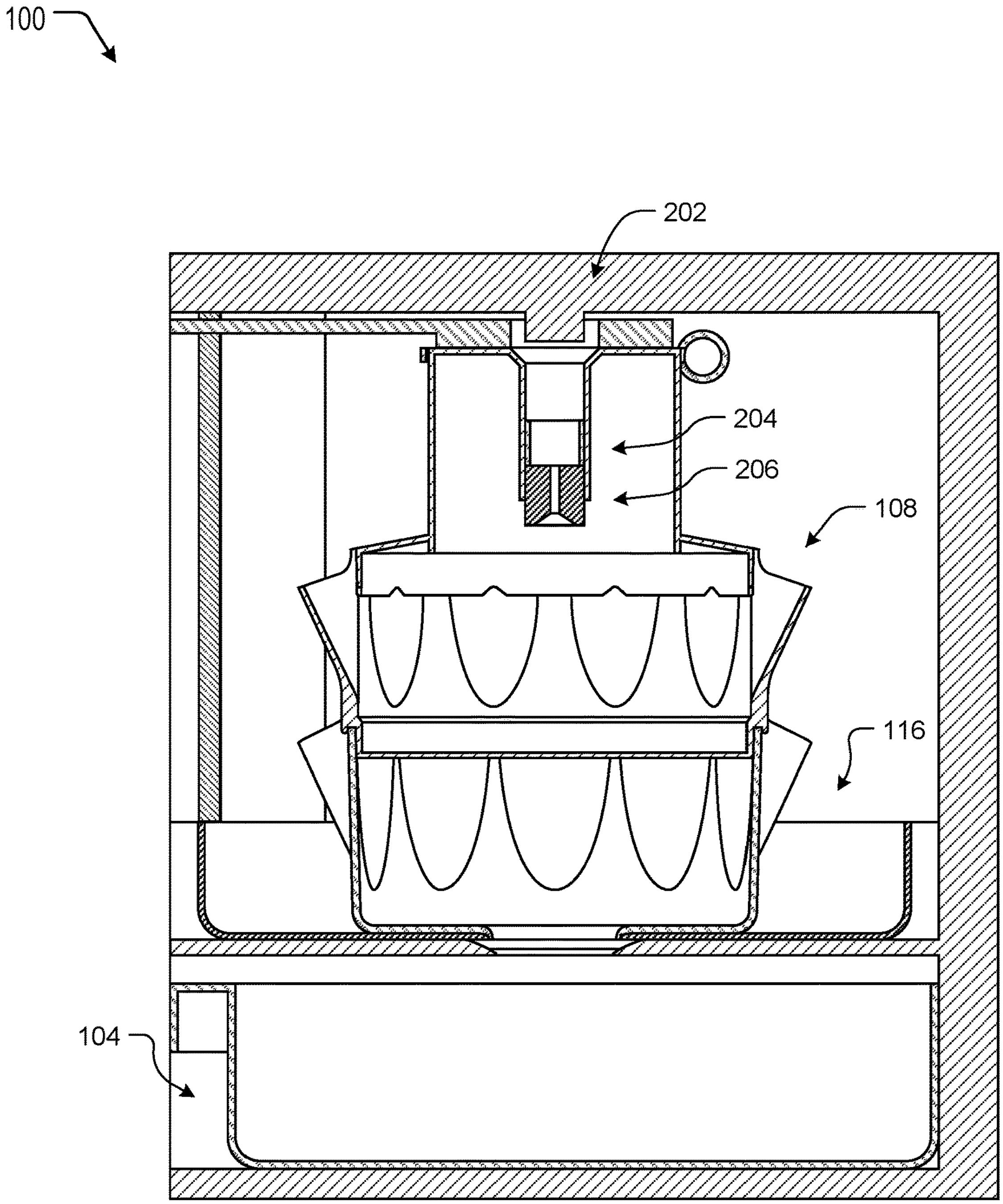
FIG. 2 is an example pictorial diagram of an interior of the countertop enclosed growing environment or appliance of FIG. 1 according to some implementations.

FIG. 2 is an example pictorial diagram 200 of an interior of the growing chamber 112 of a countertop version of the appliance 100 of FIG. 1 according to some implementations. In the current examples, a cross section of the interior of the growing chamber 112 is illustrated from front to back with the door removed. In the current example, a top seal 202 associated with the planting column 108 and the retractable base 116 is configured to move up and down as part of a locking mechanism to prevent the base 116 from extending while the appliance 100 is in use. For example, the top seal 202 may disengage or unlock in response to the door 118 of the appliance 100 opening and reengage or lock in response to the door 118 being closed. In some cases, the top seal 202 may also prevent the planting column 108 from rotating when the base 116 is extended.

In this example, the planting column 108 may be rotatable by a worm gear and spring loaded housing system 204 positioned below the top seal 202. In this manner, the top seal 202 may engage with the worm gear and spring loaded housing system 204 to, when the door is open, to prevent the planting column 108 from rotating as the base 116 is extended and/or retracted. The current example may also include a nozzle 206, such as a spray nozzle, in fluid communication, via a hose and/or pump, with the reservoir 104 to provide fluid, such as water, to the growing medium of a seed cartridge inserted into the planting column 108. The nozzle may be on a rotatable elbow connection that lifts enough for the planting column 108 to clear its position as the planting column 108 slides outward and/or retracts back into its original position.

In the illustrated example, the countertop enclosure 100 may be approximately sixteen inches tall, sixteen inches deep, and twenty inches wide. The planting column 108 may include two rows of planting slots with 9-10 planting slots per row. However, it should be understood that other configurations, sizes, dimensions, and number of planting slots may be implemented in other examples.

Figure 3:
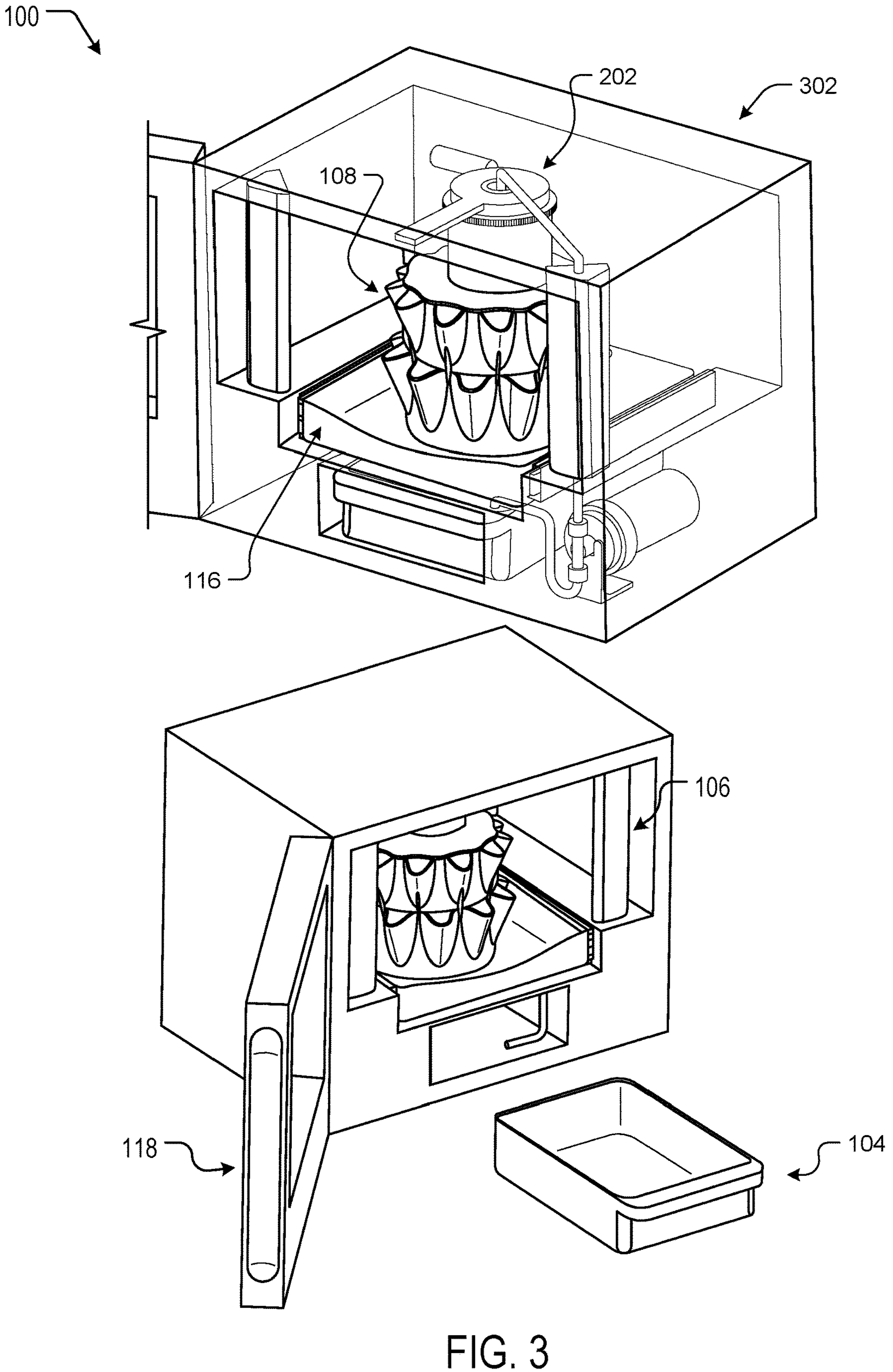
FIG. 3 is another example pictorial diagram of an interior of the countertop enclosed growing environment or appliance of FIG. 1 according to some implementations.

FIG. 3 is an example pictorial diagram 300 of an interior of the countertop enclosed growing environment or appliance 100 of FIG. 1 according to some implementations. As discussed above, the top seal 202 may be associated with the planting column 108 and is configured to move up and down as part of a locking mechanism to prevent the retractable base 116 from extending while the appliance 100 is in use. For example, the top seal 202 may disengage or unlock in response to the door 118 of the appliance 100 opening and reengage or lock in response to the door 118 being closed. In some cases, the top seal 202 may also prevent the planting column 108 from rotating when the base 116 is extended.

In some implementations, the appliance 100 may be equipped with one or more lighting and control columns (or panels), generally indicated by 302. The lighting and control columns 302 may be configured within the interior of the growing chamber 112. The lighting and control columns 302 may be equipped with various sensors and/or illuminators for monitoring the individual plants. For example, the lighting and control columns 302 may be equipped with one or more sensors, such as image devices (e.g., red-green-blue image devices, infrared image devices, monochrome image devices, lidar devices, and the like), humidity sensors, temperature sensors, carbon dioxide (CO2) sensors, spectral sensors, and the like to generate sensor data associated with the interior of the growing chamber 112 and individual plants associated with the planting column 108. In some cases, the lighting and control columns 302 may also be equipped with one or more illuminators (such as visible lights, infrared illuminators, ultraviolet lights, and the like). The illuminators may be adjustable to provide specific spectrums, amounts of light, and intensities of light to each individual planting slot based on the corresponding plant's health, life stage, size, and type or species. In some cases, the lighting and control columns 302 may also include multiple rows or columns of sensors and/or illuminators. For example, the lighting control columns 302 may include an upper row (or column) of sensors and/or illuminators, a middle row (or column) of sensors and/or illuminators, and a bottom row (or column) of sensors and/or illuminators. In other cases, the lighting and control columns 302 may include a row or column of sensors 106 and/or illuminators 104 for each corresponding row or column of plants.

In some implementations, a field of view or a region of interest associated with each of the sensors and/or illuminators may be adjustable such that a single sensor and/or illuminator may, respectively, capture data and provide light to multiple planting locations or slots while maintaining individual per plant spectrum, amount, and intensity characteristics. For example, the individual growing conditions (e.g., health, size, stage of life, species, and the like) may be detected or determined per plant.

Figure 4:
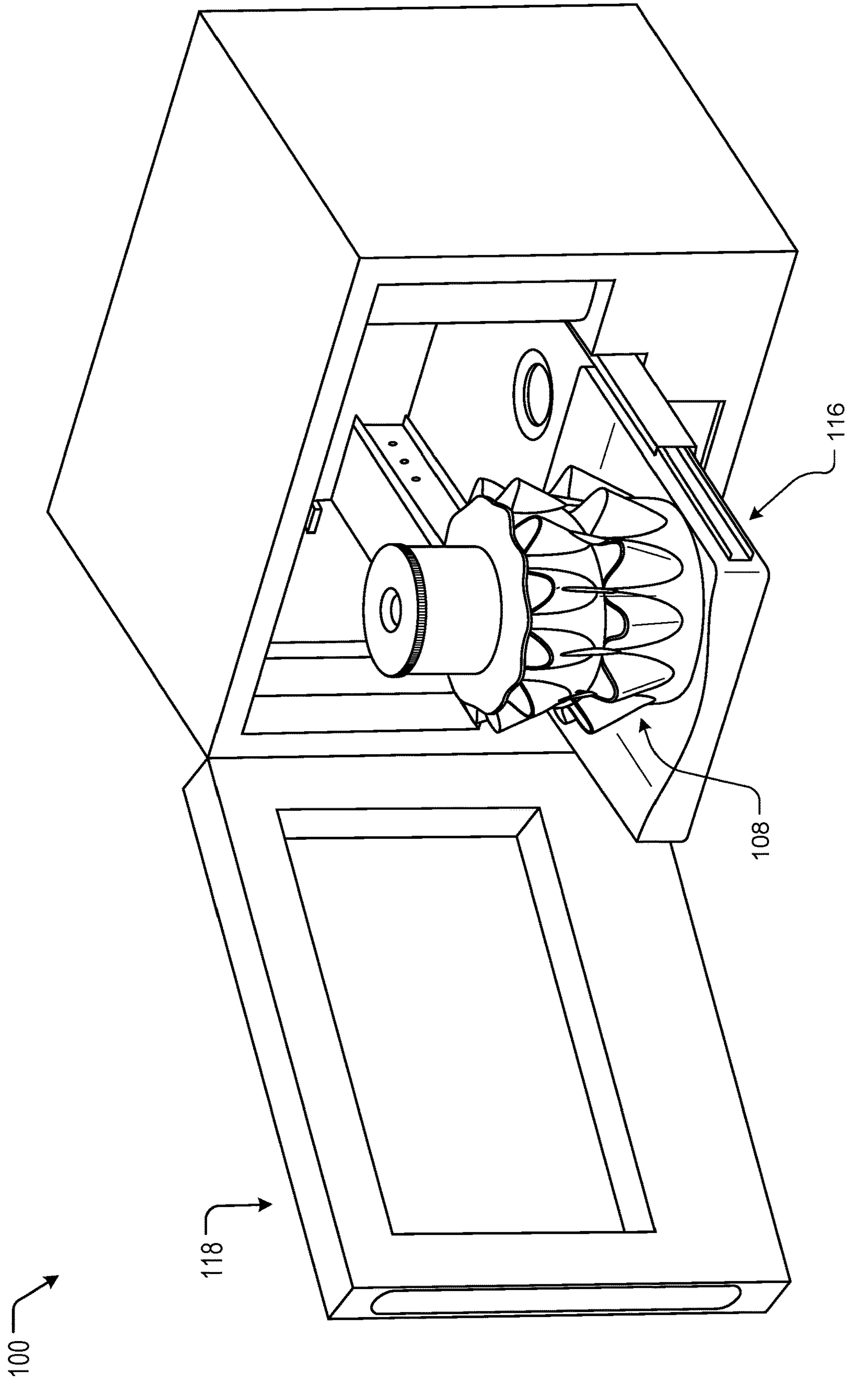
FIG. 4 is yet another example pictorial diagram of an interior of the countertop enclosed growing environment or appliance of FIG. 1 according to some implementations.

FIG. 4 is an example pictorial diagrams 400 of an interior of the growing chamber 112 of a countertop version of the appliance 100 of FIG. 1 according to some implementations. In the current examples, the retractable base 116 is extended along the tracks or guides 122 to allow a user or operator to access plants and vegetation associated with the planting column 108. As illustrated, an opening or drain 402 is illustrated to allow excess water and/or nutrients dispensed by the nozzle (not shown) to return to the reservoir 104 position below the planting column 108 during use. In some cases, the planting column 108 may be automatically (e.g., via an electrical control) or manually (e.g., operated by the user) rotatable while the planting column 108 and base 116 are extended to further improve the user's access to the plants and vegetation associated with the planting column 108.

Figure 5:
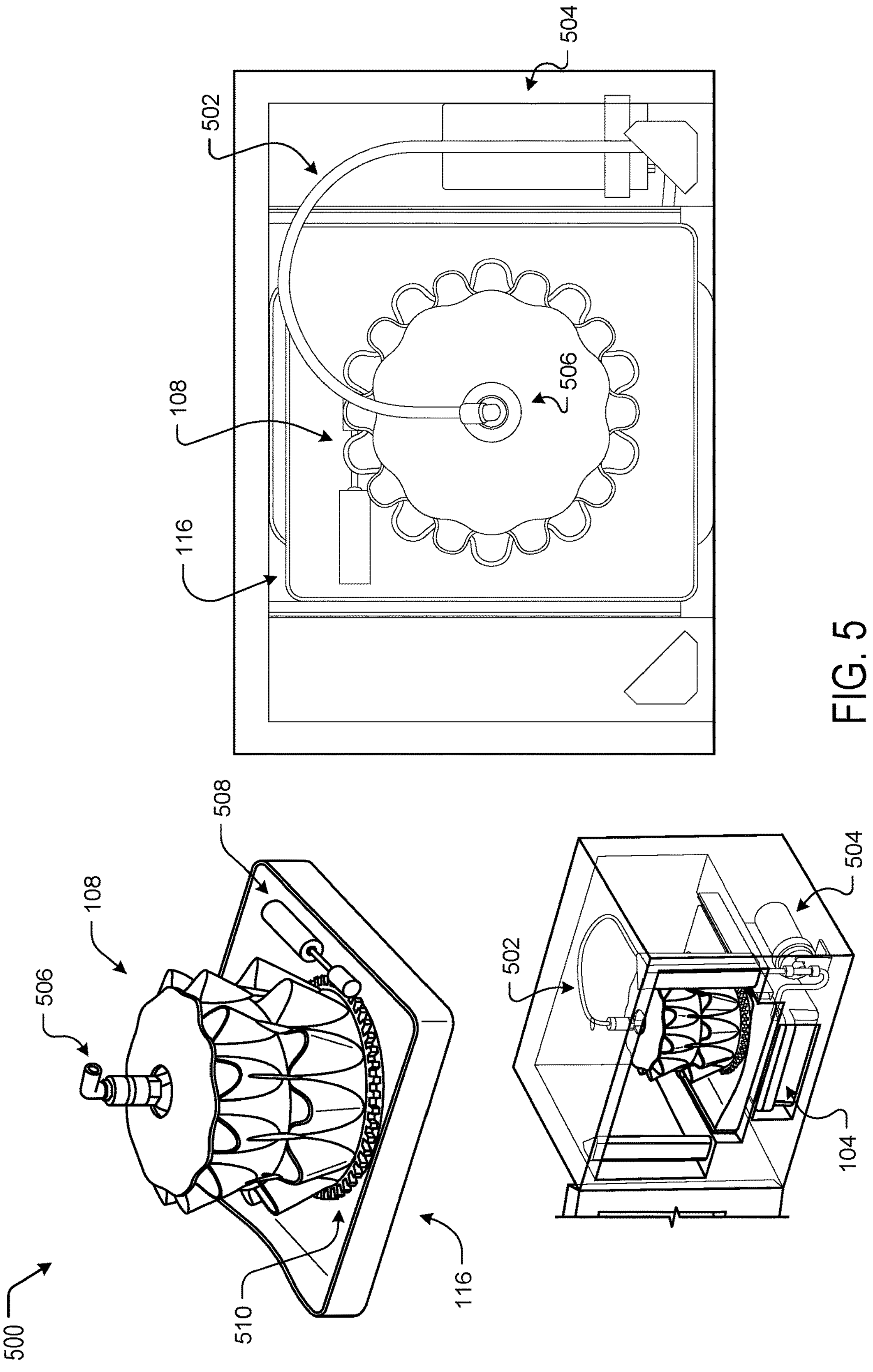
FIG. 5 is an example pictorial diagram of the planting column and retractable base of FIG. 1 according to some implementations.

FIG. 5 is an example pictorial diagram 500 of the planting column 108 and retractable base 116 of FIG. 1 according to some implementations. In this example, the nozzle 206 of FIG. 2 is shown in fluid communication with the reservoir 104 via a flexible hose 502 and a pump 504. In the current example, the hose 502 may be sized to allow the hose 504 to flex and move, to remain coupled to the nozzle 206, via coupling component 506 while the planting column 108 and the retractable base 116 are extended and retreated. In other examples, the coupling component 506 may be configured to engage and disengage from the nozzle as the planting column 108 is, respectively, retracted and extended.

The current example also illustrates a motor 508 configured to cause or engage a gear 510 associated with the planting column 108, thereby, rotating the planting column 108 within the appliance 100. In some cases, the motor 508 may be variable speed which may be controlled by a user via a mobile application, a cloud-based service, or other interactable interface associated with the appliance 100 (such as a knob, touch screen, or the like on the exteriors of the appliance 100). In the current example, the motor 508 is positioned within the base 116, such that the motor 508 remains engaged with the planting column 108 as the retractable base 116 is extended out of the appliance 100 and returned into the growing chamber 112. In this manner, the motor 508 may be configured to rotate or turn the planting column 108 while the planting column 108 is within the growing chamber 112 or while the base 116 is extended for user access.

Figure 6:
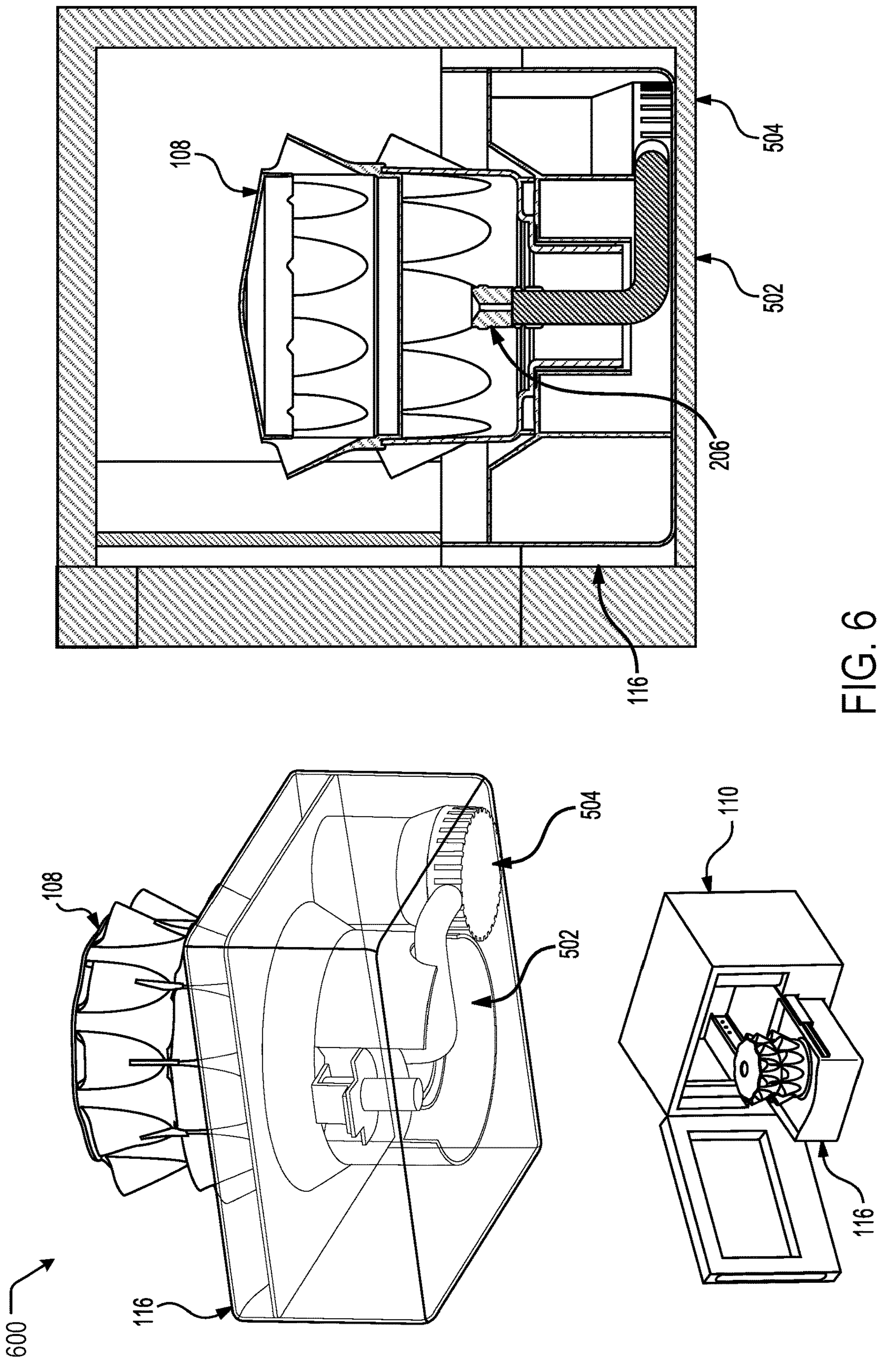
FIG. 6 is another example pictorial diagram of the planting column and retractable base of FIG. 1 according to some implementations.

FIG. 6 is another example pictorial diagram 600 of the planting column 108 and retractable base 116 of FIG. 1 according to some implementations. In the current example, the nozzle 206 may be configured along a lower portion of the planting column 108. The nozzle 206 is again coupled to the reservoir via the hose 502 and the pump 504. However, in this example, the reservoir, the hose 502, and the pump 504 may be located within or integrated into the base 116, such that the reservoir 104, base 1116, and planting column 108 extend together when the appliance 100 is transitioned to the second open position, generally indicated as 110. In this example, a top portion of the appliance 100 may be free of plumbing and other components, and the plumbing may be positioned within a watertight area of the reservoir, thereby reducing the likelihood of leaks or other water damage to the appliance 100 or other countertop appliances placed in proximity by the user. In some cases, the opening for the nozzle 206, in the current implementation, may also serve as a drain function allowing the water to return to the reservoir 104.

Figure 7:
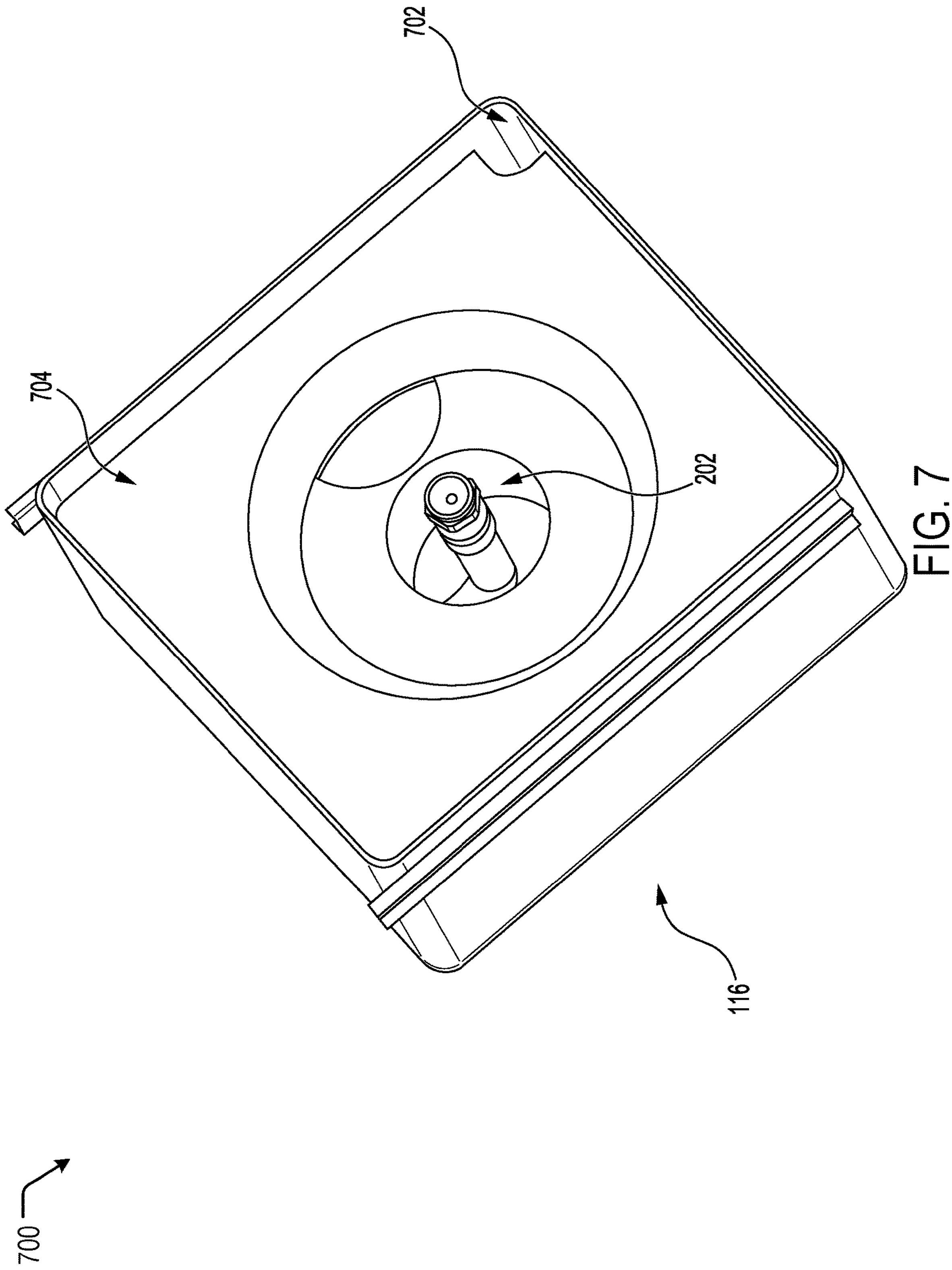
FIG. 7 is another example pictorial diagram of the base member with integrated reservoir of FIG. 6 according to some implementations.

FIG. 7 is another example pictorial diagram 700 of the base member 116 with integrated reservoir 104 of FIG. 6 according to some implementations. In the current example, the base 116 may include an opening 702 for both removing the top plate 704 and/or for filling the reservoir 104 by receiving liquids or fluids, such as water, from a fluid source. The fluids may then be stored in the reservoir 104 below the top plate 704, such that the fluids may again be pumped through the nozzle 202 into the growing medium of the seed cartridges. In this example, the top plate 704 may be configured to support the planting column (not shown) while allowing the planting column to rotate. The rotatable socket itself may be the reservoir to avoid a separate vessel for the hydroponic nutrient solution.

In the current example, the top plate 704 may also include a depression 706 to receive and assist in maintaining a position of the planting column during use. In some cases, the depression 706 may have sloping walls that allow excess fluids or water pooling on the top plate 704 to be directed into the reservoir 104 via an opening 710, as illustrated. In some examples, the main surface 708 of the top plate 704 may also have an incline or slope that assists in directing the fluids into the reservoir 104 via the opening 710. In this manner, the opening 710 may drain any excess fluids from the planting column and the top plate 704 to prevent seeping or spilling out of the appliance.

Figure 8:
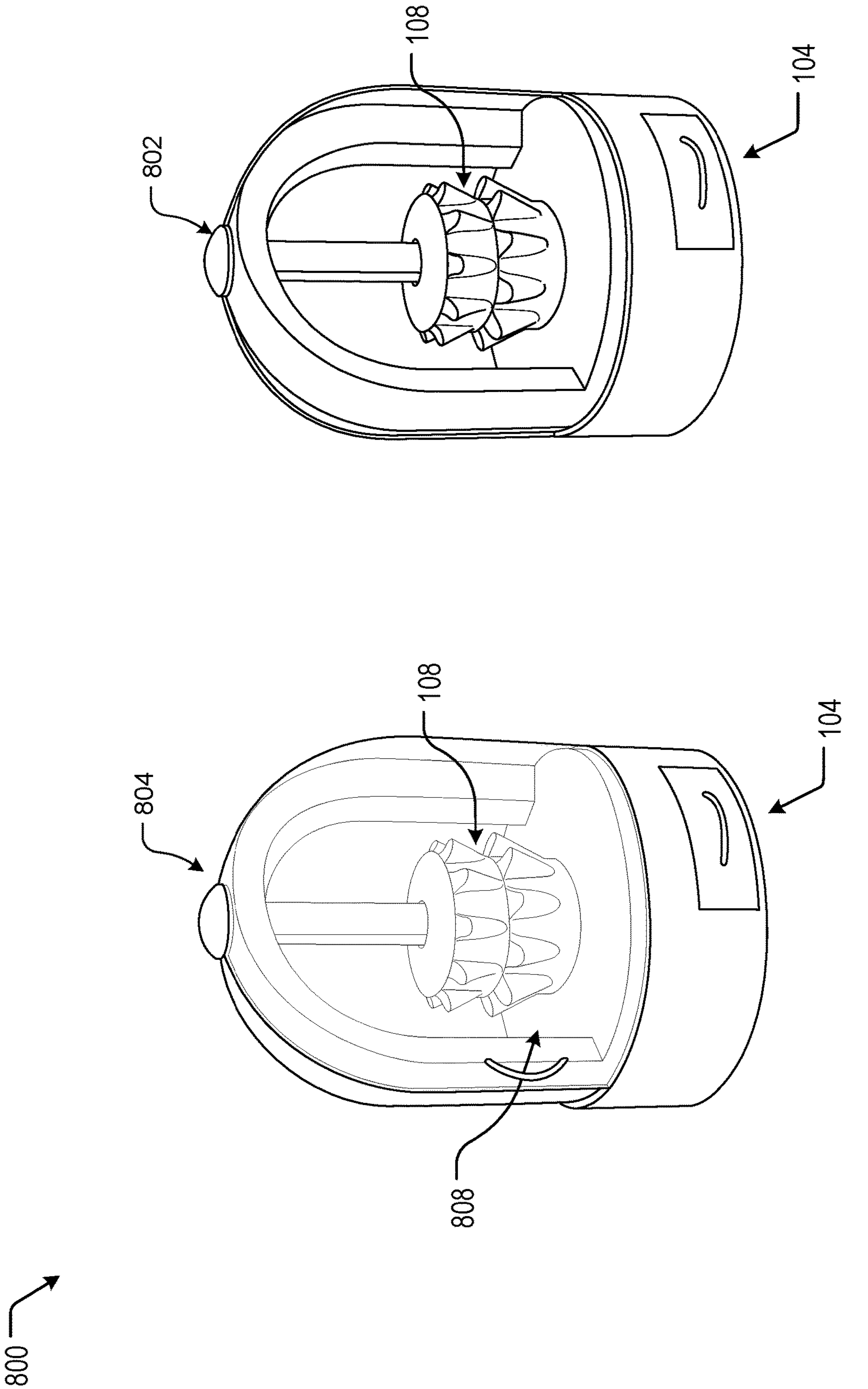
FIG. 8 is an example pictorial diagram of a countertop enclosed growing environment or appliance according to some implementations.

FIG. 8 is an example pictorial diagram of a countertop enclosed growing environment or appliance 800 according to some implementations. In this example, the appliance 800 is shown in an open configuration 802 and a closed configuration 804. In this example, the door 806 may be transitioned between the open configuration 802 and the closed configuration 804 by a user or one or more motors sliding the door 806 in a circular motion around to the rear of the appliance 800. In some cases, the motors may activate in response to a user engagement with a control, such as an application on an electronic device, cloud-service, or an interface on the appliance 800.

Similar, to the example of FIG. 1, discussed above, the appliance 800 may be sealed or create an enclosed environment that is physically separate from and has different environmental conditions than the exterior or surrounding environment. The appliance 800 also has a removable reservoir 104 positioned below the planting column 108 as discussed above. In this example, the planting column 108 may be formed by one or more rings 808 of the planting column 108 in a variable manner to form a desired number of rings or provide a desired number of planting receptacles. In this example, two rings 808 are shown, however, it should be understood that more rings may be utilized in other implementations.

Figure 9:
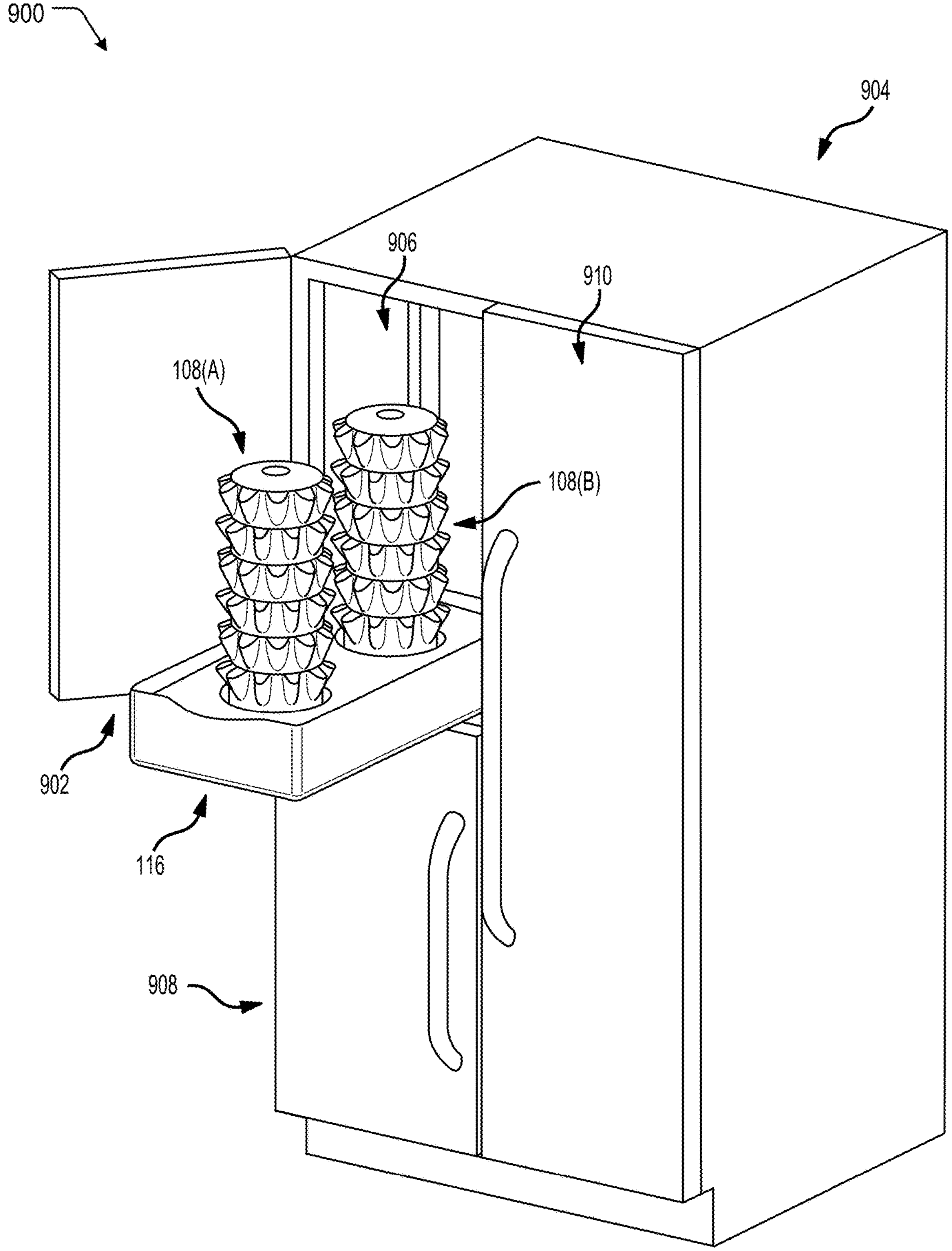
FIG. 9 is an example pictorial diagram of an enclosed growing environment or appliance incorporated into a refrigerator according to some implementations.

FIG. 9 is an example pictorial diagram 900 of an enclosed growing environment or appliance 902 incorporated into a refrigeration unit 904 according to some implementations. For example, as shown, one compartment 906 of a refrigeration unit 904 may be converted to act as the enclosed growing environment 902. In this example, the enclosed growing environment 902 may utilize the water lines and/or water caused by condensation on the condenser, compressor, or other component of the refrigeration unit 904 to provide clean filtered water to the seed cartridges. In the case of the condensation, the water generated is precleaned, prefiltered, and the like, thus, reducing the overall complexity, components, and costs associated with operating and maintaining the enclosed growing environment 902. In some cases, such as the illustrated example, the appliance 902 may also include a first chamber or compartment 910 and a second chamber or compartment 908 that may each provide a climate control at a specific temperatures (e.g., a first temperature and a second temperature) and have individual doors (such as a first door and a second door) to physically isolate the interior from the exterior environment. In some cases, the first chamber or compartment 910 may be a refrigeration chamber and the second chamber or compartment 908 may be a freezer chamber. In this example, the enclosed growing environment 902 is incorporated into a compartment of the refrigeration unit 904, however, it should be understood that in other examples, the enclosed growing environment 902 may be positioned adjacent to the refrigeration unit 904, added as an additional compartment to the refrigeration unit 904, and the like while still being coupled to a water supply associated with the unit 904. For example, the enclosed growing environment 902 may be positioned to sit atop the refrigeration unit 904 and/or on a counter adjacent to the refrigeration unit 904.

In this example, the enclosed growing environment 902 may also include multiple planting columns, such as planting columns 108(A) and 108(B). While two planting columns are shown, it should be understood that any number of planting columns may be included and that the planting columns may be arranged in other configurations, such as in multiple rows (e.g., two rows of two columns), side by side, in an offset or staggered arrangement, and the like.

As illustrated and discussed above, a retractable base 116 may be utilized in conjunction with the multiple planting columns 108. In this manner, the planting columns 108 together with the base 116 may extend outward from the enclosed growing environment 902 and the refrigeration unit 904 to allow a user or operator to access the plants and vegetation being cultivated. In some cases, the planting columns 108 may be configured to rotate while the base 116 is extended to allow the user to access each of the planting receptacles associated with each of the planting columns 108. In the current example, the water reservoir is incorporated into the base 116 as discussed above. However, it should be understood that the water reservoir may be removable from the base 116 or positioned below the base 116, such as discussed with respect to FIG. 1.

The enclosed growing environment 902 of the refrigeration unit 904 may also include one or more lighting control columns 302 as discussed above with respect to FIG. 3. The lighting control columns 302 may be configured to provide customized lighting to each individual plant of each of the planting columns 108.

Figure 10:
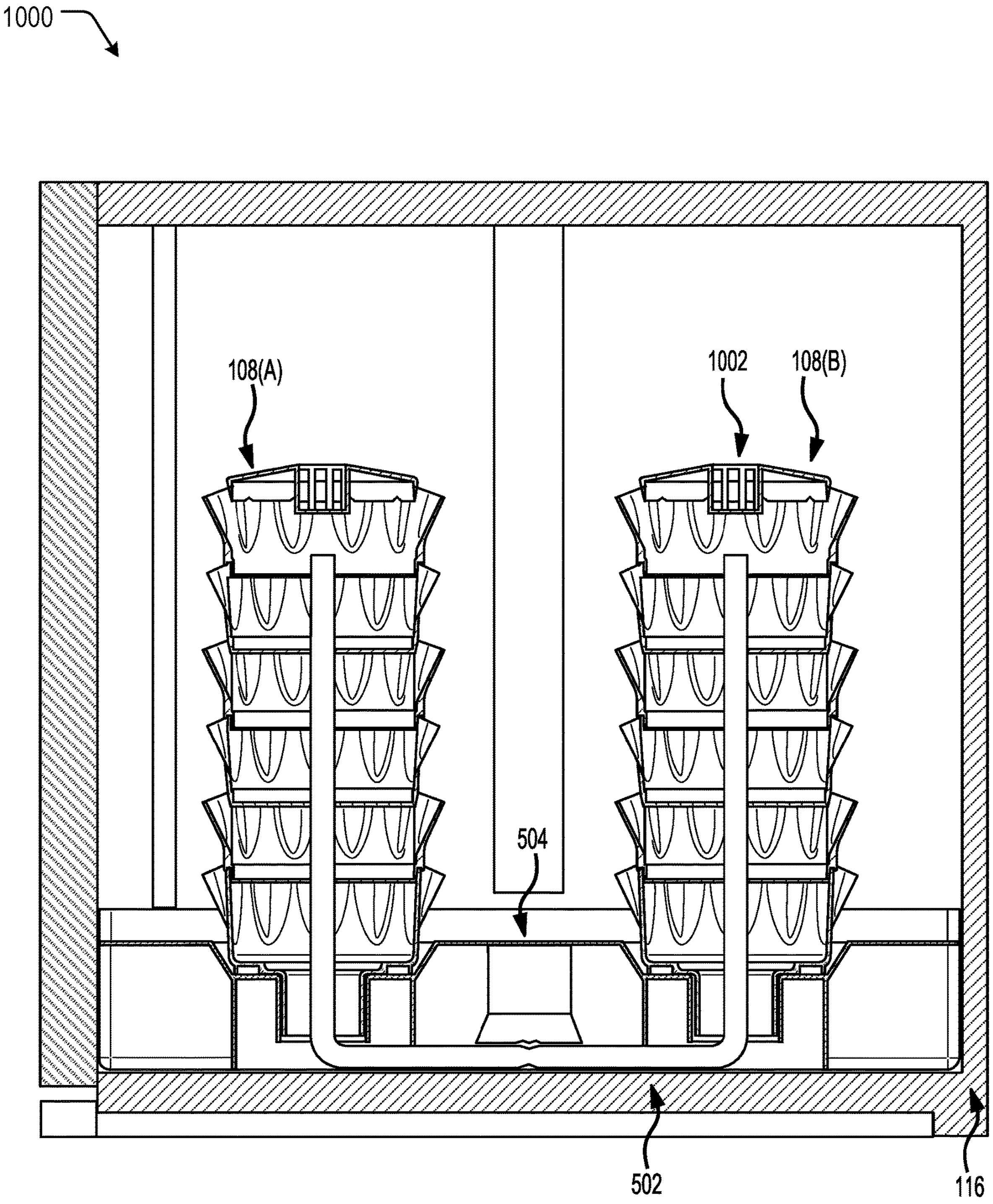
FIG. 10 is an example pictorial diagram of the planting column and retractable base of FIG. 9 according to some implementations.

FIG. 10 is an example pictorial diagram 1000 of the planting column 108(A) and 108(B) and retractable base 116 of FIG. 9 according to some implementations. In this example, the planting columns 108 are again positioned atop or supported by a top plate 704 of a base 116 including an integrated reservoir below the top plate 704. A pump 504 and a hose 502 connect the reservoir in fluid communication with the each of the planting columns 108 (e.g., the inserted seed cartridges), such that the water or fluid within the reservoir is pumped into the growing medium of the seed cartridges during operation and the excess fluid may drain out of the bottom of the planting columns 108 and return to the reservoir, as discussed above. In some cases, each planting column 108 may be configured with an individual reservoir, pump, and/or hose to provide more customized fluids to the plants and vegetation associated with the individual planting columns 108.

Figure 11:
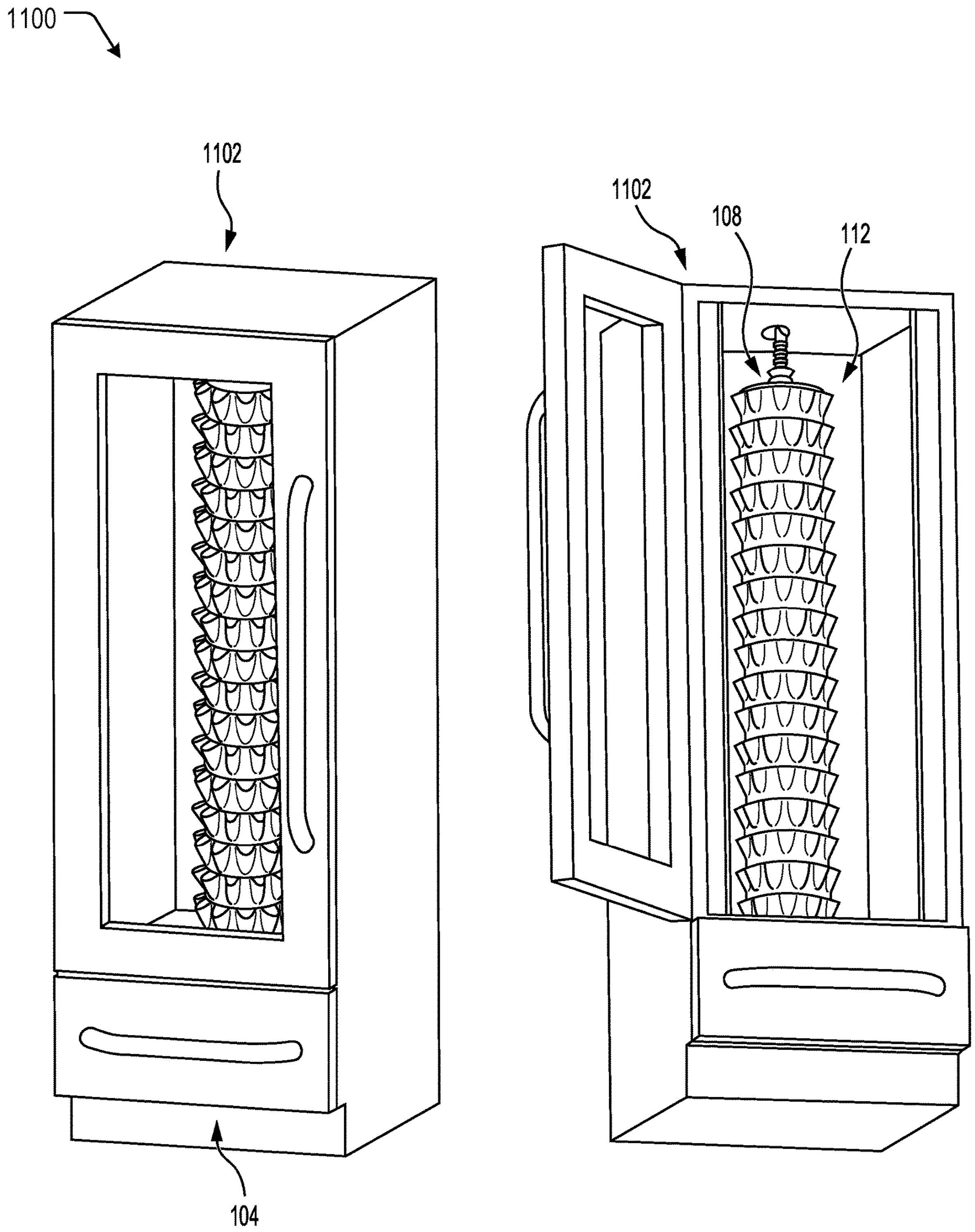
FIG. 11 is an example pictorial diagram of a built-in or upright enclosed growing environment or appliance according to some implementations.

FIG. 11 is an example pictorial diagram of a built-in or upright enclosed growing environment or appliance 1100 according to some implementations. Again, the appliance 1100 is shown in an open configuration 1102 and a closed configuration 1104. In this case, the appliance 1100 is extended upward to increase the produce output by the appliance 1100 by taking advantage of additional vertical space that a user may have available, such as in a basement or garage of a home. In this example, the appliance 1100 include a planting column 108 and a removable reservoir 104 posited in a drawer below the growing chamber 112.

In this example, the height of the appliance 1100 and the height of the planting column 108 may vary depending on, for instance, a ceiling height. For instance, the appliance 1100 may include an eight foot implementation, a ten foot implementation, a twelve foot implementation, and the like. In some examples, the appliance 1100 may also be sized to fit under a counter, such as a three foot implementation, a four foot implementation, a five foot implementation or the like.

Figure 12:
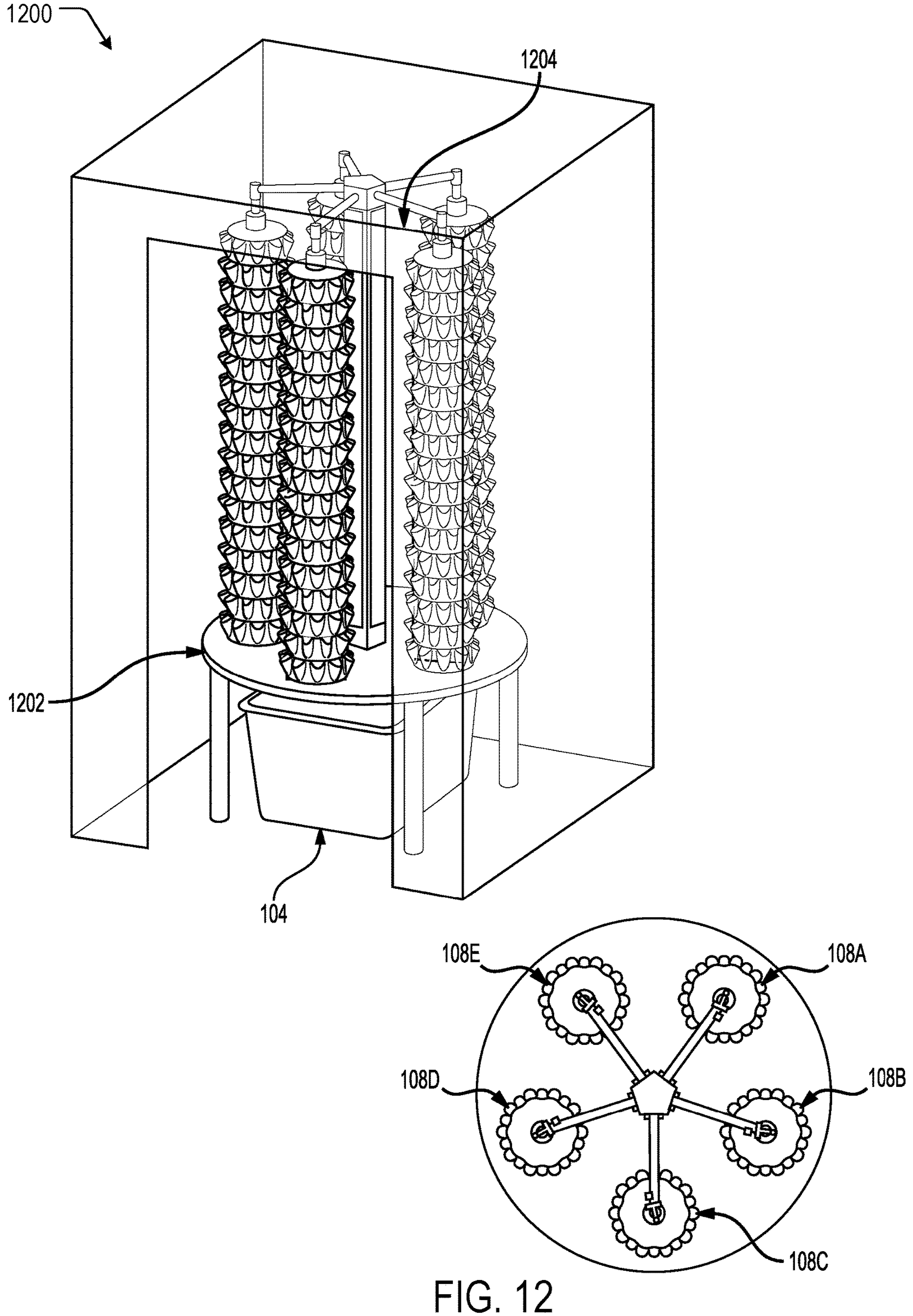
FIG. 12 is another example pictorial diagram of a built-in or upright enclosed growing environment or appliance according to some implementations.

FIG. 12 is another example pictorial diagram of a built-in or upright enclosed growing environment or appliance 1200 according to some implementations. In this example, the appliance 1200 may include multiple planting columns 108(A)-(E) that may be configured to rotate or otherwise be coupled to a rotatory surface, such as surface 1202 in the illustrated example. Thus, in some implementations, the surface 1202 may rotate and/or each individual planting column 108 may rotate. For instance, the surface 1202 may rotate to provide ease of access to each of the individual planting columns 108 and each of the planting columns 108 may rotate to provide improved uniformity with respect to lighting and other environmental conditions.

In this example, a full size door (not shown) may be configured to allow access to the growth chamber 112 via a door area 1206. In this manner, each of the planting columns 108 may be accessed as each of the planting columns 108 may be rotated by the surface 1202 to the front or the door area 1206 and each planting column 108 may individually rotate to allow access to receptacles positioned on all sides of each column 108. The appliance 100 may also include a fluid distribution system 1210 to allow fluid communication between the reservoir 104 with the top of each planting column 108. In this example, each planting column 108 may be coupled to the fluid distribution system 1210 via a hose or pipe 1212 that may be decoupled when the planting column 108 is not in use.

In this example, light and sensor systems, generally indicated by 1204, may be positioned along the interior space between the planting columns 108. In this manner, the planting column assembly, generally indicated by 1208, (including the planting columns 108, lighting and sensor systems 1204, fluid distribution system 1210, and the like) may be removable from the enclosure of the appliance 1200 to facilitate maintenance and the like. In some cases, additional lighting and sensor systems may be positioned along an interior surface of the growing chamber 112.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. An appliance comprising:

a growing chamber defining an interior enclosure having at least one controllable environmental characteristic, the growing chamber having an open configuration and a closed configuration, wherein when the growing chamber is in the open configuration the interior enclosure is exposed to an exterior environment and when the growing chamber is in the closed configuration a door physically isolates the interior enclosure from the exterior environment, the door slidable by a motor from a front of the system in the closed configuration to the rear of the system in the open position;

a base configured to at least partially extend from the growing chamber when the growing chamber is in the open configuration and to retract within the interior enclosure when the growing chamber is in the closed configuration;

a reservoir positioned below the base and removable from the appliance independently from the base; and a planting column positioned over the base and configured to extend and retract together with the base, the planting column configured to rotate in the closed configuration when retracted into the interior enclosure and in the open configuration when extended into the exterior environment, the planting column including multiple rings with at least five planting receptacles per ring and wherein the number of rings are variable to form a desired number of rings or a desired number of planting receptacles.

2. The appliance of claim 1, wherein the planting column includes at least two rings, each of the rings including a plurality of planting receptacles and each of the planting receptacles is configured to receive a seed cartridge.

3. The appliance of claim 1, wherein the planting column includes a drain to allow excess fluids to flow from the drain into the reservoir.

4. The appliance of claim 1, further comprising:

a fluid distribution system; and a pump associated the fluid distribution system to distribute fluids from the reservoir to at least one planting receptacle of the planting column.

5. The appliance of claim 1, wherein the appliance is integrated into a refrigeration unit.

6. The appliance of claim 5, wherein the reservoir associated with the planting column is in fluid communication with a water source associated with the refrigeration unit.

7. The appliance of claim 6, wherein the water source is at least one of:

condensation on a condenser of the refrigeration unit;

condensation on a compressor of the refrigeration unit; or a water line associated with the refrigeration unit.

8. The appliance of claim 1, further comprising:

a sensor to generate sensor data associated with at least one plant being cultivated within the growing chamber; and a system to:

determine, based at least in part on the sensor data, that the plant has reached between approximately 90 and 95 percent of a maximum growth; and responsive to determining that the plant has reached between approximately 90 and 95 precent of the maximum growth, sending a harvest alert to a user associated with the appliance.

9. The appliance of claim 1, wherein the planting column is a first planting column and the appliance further comprising:

a second planting column positioned over the base and configured to extend and retract together with the base; and wherein the first planting column may individually rotate with respect to the second planting column in either the open configuration or the closed configuration.

10. A system comprising:

a growing chamber having at least one wall associated with a rear of the system and a door to define an interior enclosure, the growing chamber having an open configuration in which the interior enclosure is exposed to an exterior environment and a closed configuration in which the interior enclosure is isolated from the exterior environment, the door slidable by a motor from a front of the system in the closed configuration to the rear of the system in the open position;

a base configured to at least partially extend from the growing chamber when the growing chamber is in the open configuration and to retract within the interior enclosure when the growing chamber is in the closed configuration; and a first planting column positioned over the base and configured to extend and retract together with the base, the first planting column to receive a variable number of rings, each ring including a plurality of planting receptacles.

11. The system of claim 10, wherein the system is a counter-top appliance.

12. The system of claim 10, wherein the system is an under-the-counter appliance.

13. The system of claim 10, wherein the system is a stand up or stand-alone appliance.

14. The system of claim 13, further comprising a second planting column positioned over the base and configured to extend and retract together with the base; and wherein the first planting column may individually rotate with respect to the second planting column in either the open configuration or the closed configuration.

15. The system of claim 13, wherein the base includes a reservoir that is in fluid communication with at least one receptacle of the first planting column.

16. The system of claim 10, wherein the system is integrated into a refrigeration unit.

17. The system of claim 16, wherein a reservoir associated with the first planting column is in fluid communication with a water source associated with the refrigeration unit.

18. The system of claim 17, wherein the water source is at least one of:

condensation on a condenser of the refrigeration unit;

condensation on a compressor of the refrigeration unit; or a water line associated with the refrigeration unit.

19. An appliance comprising:

three physically isolated chambers including:

a first refrigeration chamber for providing refrigeration level climate control at a first temperature, wherein when the first chamber is in an open configuration a first interior enclosure is exposed to an exterior environment and when the first chamber is in a closed configuration a first door physically isolates the first interior enclosure from the exterior environment;

a second freezer chamber for providing a freezer level climate control at a second temperature, the second temperature less than the first temperature and wherein when the second chamber is in an open configuration a second interior enclosure is exposed to the exterior environment and when the second chamber is in a closed configuration a second door physically isolates the second interior enclosure from the exterior environment;

a third growing chamber defining an interior enclosure having at least one controllable environmental characteristic, the third growing chamber having an open configuration and a closed configuration, wherein when the third growing chamber is in the open configuration a third interior enclosure is exposed to the exterior environment and when the third growing chamber is in the closed configuration a third door physically isolates the third interior enclosure from the exterior environment;

a base configured to at least partially extend from the third growing chamber when the third growing chamber is in the open configuration and to retract within the third interior enclosure when the third growing chamber is in the closed configuration;

a planting column positioned over the base and configured to extend and retract together with the base, the planting column configured to rotate in the closed configuration when retracted into the interior enclosure and in the open configuration when extended into the exterior environment, the planting column including multiple rings;

a condenser to maintain the first chamber at the first temperature and the second chamber at the second temperature; and a reservoir is in fluid communication with a water source associated with the appliance and the planting column.

20. The appliance of claim 19, wherein the number of rings are variable.

* * * * *